(12) United States Patent
Panjer

(10) Patent No.: US 11,417,989 B2
(45) Date of Patent: Aug. 16, 2022

(54) GALLEY INSERT POWER CONNECTOR ASSEMBLY WITH SPRING ASSEMBLIES

(71) Applicant: KONINKLIJKE FABRIEK INVENTUM B.V., Nieuwegein (NL)

(72) Inventor: Frederik A. S. Panjer, Maarsbergen (NL)

(73) Assignee: Koninklijke Fabriek Inventum B.V., Nieuwegein (NL)

( * ) Notice: Subject to any disclaimer, the term of this patent is extended or adjusted under 35 U.S.C. 154(b) by 224 days.

(21) Appl. No.: 16/817,250

(22) Filed: Mar. 12, 2020

(65) Prior Publication Data
US 2021/0288442 A1   Sep. 16, 2021

(51) Int. Cl.
| | | |
|---|---|---|
| H01R 13/631 | (2006.01) |
| B64D 11/04 | (2006.01) |
| H01R 13/15 | (2006.01) |
| H01R 13/74 | (2006.01) |
| H01R 24/28 | (2011.01) |
| H01R 107/00 | (2006.01) |

(52) U.S. Cl.
CPC ......... *H01R 13/6315* (2013.01); *B64D 11/04* (2013.01); *H01R 13/15* (2013.01); *H01R 13/748* (2013.01); *H01R 24/28* (2013.01); *B64D 2221/00* (2013.01); *H01R 2107/00* (2013.01)

(58) Field of Classification Search
CPC .............. H01R 2107/00; H01R 24/28; H01R 13/6315; H01R 13/15; H01R 13/748; B64D 11/04; B64D 2221/00
USPC .................................................. 439/246, 248
See application file for complete search history.

(56) References Cited

U.S. PATENT DOCUMENTS

| | | | | | |
|---|---|---|---|---|---|
| 3,094,364 | A | * | 6/1963 | Liagg | H01R 13/629 439/247 |
| 5,383,790 | A | * | 1/1995 | Kerek | H01R 13/6315 439/152 |
| 5,662,488 | A | * | 9/1997 | Alden | H01R 13/625 439/314 |

(Continued)

FOREIGN PATENT DOCUMENTS

| | | | | |
|---|---|---|---|---|
| EP | 0717470 A2 | | 6/1996 | |
| EP | 0893856 A2 | * | 1/1999 | ......... H01R 13/6315 |
| EP | 3514889 A1 | | 7/2019 | |

OTHER PUBLICATIONS

Cinch Connectivity Solutions (Bel), C-ENX Galley Connector, ARINC 810 c-enx, https://www.connectorsupplier.com/modular-rectangfular-connectors/, accessed Jan. 20, 2020.

(Continued)

*Primary Examiner* — Marcus E Harcum
(74) *Attorney, Agent, or Firm* — Suiter Swantz pc llo

(57) ABSTRACT

A system may include an aircraft galley insert configured to be installed within an aircraft galley insert bay, a mounting plate attached to a rear of the aircraft galley insert, and a power connector assembly attached to the mounting plate. The power connector assembly may include compressible spring assemblies that compress as the power connector assembly is mated with a corresponding power connector assembly of the aircraft galley insert bay. The power connector assembly may self-align with the corresponding power connector assembly of the aircraft galley insert bay when the aircraft galley insert is installed within the aircraft galley insert bay.

10 Claims, 9 Drawing Sheets

(56) References Cited

U.S. PATENT DOCUMENTS

| | | | | |
|---|---|---|---|---|
| 5,746,617 A * | 5/1998 | Porter, Jr | ........... | H01R 13/6315 439/248 |
| 6,261,122 B1 * | 7/2001 | Richter | .............. | H01R 13/6315 439/477 |
| 6,592,387 B2 | 7/2003 | Komenda et al. | | |
| 7,074,065 B1 | 7/2006 | Martinez et al. | | |
| 7,121,857 B1 | 10/2006 | Lewis | | |
| 7,419,394 B2 * | 9/2008 | Jensen | ................. | H05K 7/1452 439/248 |
| 7,422,486 B2 * | 9/2008 | Hoff | ........................ | G06F 3/023 439/660 |
| 7,829,825 B2 * | 11/2010 | Kuhne | ................. | F24C 15/327 219/401 |
| 10,103,497 B2 * | 10/2018 | Tsang | ...................... | H01R 13/41 |
| 10,553,995 B2 * | 2/2020 | Houry | ................. | H01R 13/621 |
| 2001/0002344 A1 * | 5/2001 | Yokoi | ................. | H01R 13/748 439/247 |
| 2002/0081881 A1 * | 6/2002 | Komenda | .......... | H01R 13/6315 439/247 |
| 2002/0177340 A1 | 11/2002 | Carrodus et al. | | |
| 2005/0082271 A1 * | 4/2005 | Kuhne | ................. | F24C 15/322 219/401 |
| 2006/0141836 A1 * | 6/2006 | Van Der Mee | .... | H01R 13/6315 439/247 |
| 2009/0311910 A1 * | 12/2009 | Kleinke | ................... | H01R 9/03 439/607.51 |
| 2011/0287667 A1 * | 11/2011 | Ichio | ................. | H01R 13/4367 439/660 |
| 2013/0194769 A1 * | 8/2013 | Belack | .................... | F41A 35/00 361/807 |
| 2014/0120750 A1 * | 5/2014 | Johnson | ................. | H01R 27/00 439/131 |
| 2015/0266580 A1 | 9/2015 | Lee et al. | | |
| 2015/0288108 A1 * | 10/2015 | Fischer | ................ | H01R 13/652 439/88 |
| 2019/0260150 A1 * | 8/2019 | Costello | ................ | H01R 13/187 |
| 2019/0308774 A1 | 10/2019 | White | | |

OTHER PUBLICATIONS

Extended Search Report for European Application No. 21161110.8 dated Jul. 22, 2021, 11 pages.

* cited by examiner

GALLEY INSERT POWER CONNECTOR ASSEMBLY WITH SPRING ASSEMBLIES

BACKGROUND

When aircraft galley insert ovens are installed within aircraft galley insert bays, often the power connectors on the aircraft galley insert ovens are misaligned with corresponding power connectors of the aircraft galley insert bays. This misalignment can often damage the power connectors and/or the corresponding power connectors. Additionally, this misalignment can damage oven connector plates. Further, such misalignment can result in improper connection between connector pins that can result in power failures for the aircraft galley insert ovens.

SUMMARY

In one aspect, embodiments of the inventive concepts disclosed herein are directed to a system. The system may include an aircraft galley insert configured to be installed within an aircraft galley insert bay, a mounting plate attached to a rear of the aircraft galley insert, and a power connector assembly attached to the mounting plate. The power connector assembly may include compressible spring assemblies that compress as the power connector assembly is mated with a corresponding power connector assembly of the aircraft galley insert bay. The power connector assembly may self-align with the corresponding power connector assembly of the aircraft galley insert bay when the aircraft galley insert is installed within the aircraft galley insert bay.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 2:
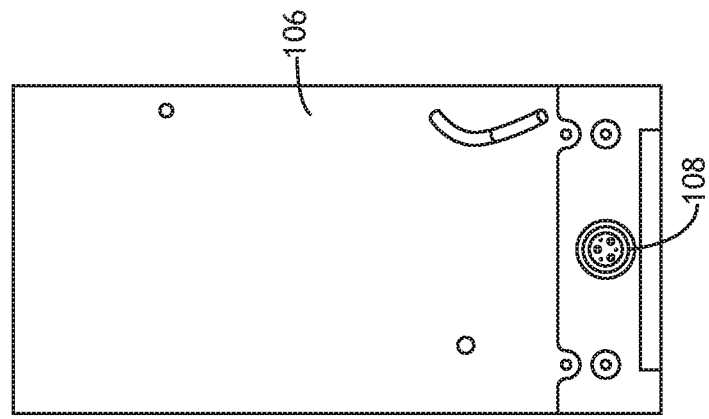
FIG. 2 is a view of an exemplary embodiment of a rear of the galley insert of the system of FIG. 1 according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method of installing an aircraft galley insert and a system including an aircraft galley insert configured to be installed within an aircraft galley insert bay, a mounting plate attached to a rear of the aircraft galley insert, and a power connector assembly attached to the mounting plate. The power connector assembly may include compressible spring assemblies that compress as the power connector assembly is mated with a corresponding power connector assembly of the aircraft galley insert bay. The power connector assembly may self-align with the corresponding power connector assembly of the aircraft galley insert bay when the aircraft galley insert is installed within the aircraft galley insert bay. Some embodiments may improve ease of installation of aircraft galley inserts in aircraft galley insert bays, may reduce occurrences of misalignment, such as misalignment of retrofit installations, may reduce a need of tight production tolerances and alignment tooling and time, and may reduce power failures caused by poor pin connections on power lines.

Referring now to FIGS. 1-13, exemplary embodiments of a system including a vehicle (e.g., an automobile, a train, a watercraft, a submarine, or an aircraft 100) are depicted according to the inventive concepts.

Figure 1:
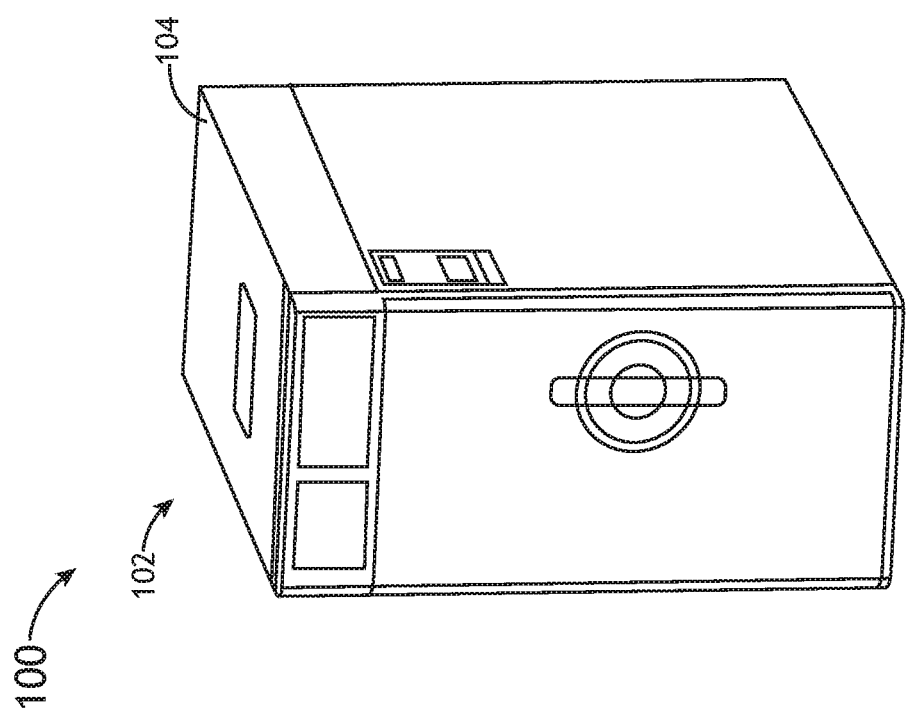
FIG. 1 is a view of an exemplary embodiment of a system including a vehicle including a galley insert in according to the inventive concepts disclosed herein.

Referring now to FIGS. 1-2, the aircraft 100 may include at least one aircraft galley 102. The aircraft galley 200 may include one or more aircraft galley inserts (e.g., aircraft galley insert ovens 104) that may be installed within aircraft galley insert bays 112 (e.g., aircraft galley insert oven bays). FIG. 1 shows a front perspective view of the aircraft galley insert oven 104. FIG. 2 shows a rear view of the aircraft galley insert oven 104. Each aircraft galley insert oven 104 may be generally shaped as a parallelepiped, which may have a front, a rear 106, a top, a bottom, and two sides. A power connector assembly 108 may be located at the rear 106 of the aircraft galley insert oven 104.

Figure 3:
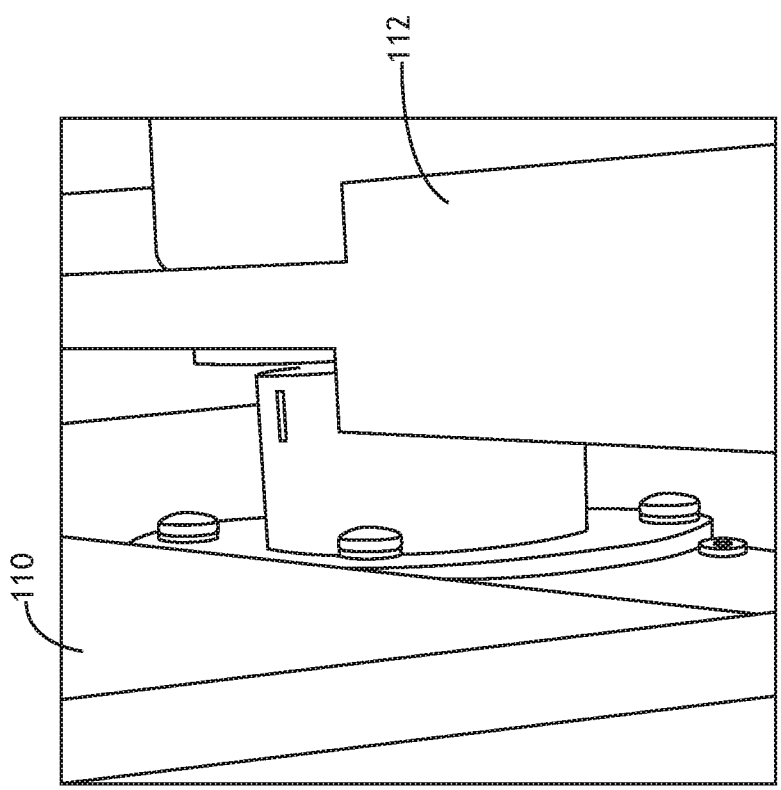
FIG. 3 is a view of a portion the galley insert installed in a galley insert bay of the system of FIG. 1 according to the inventive concepts disclosed herein.
Figure 4:
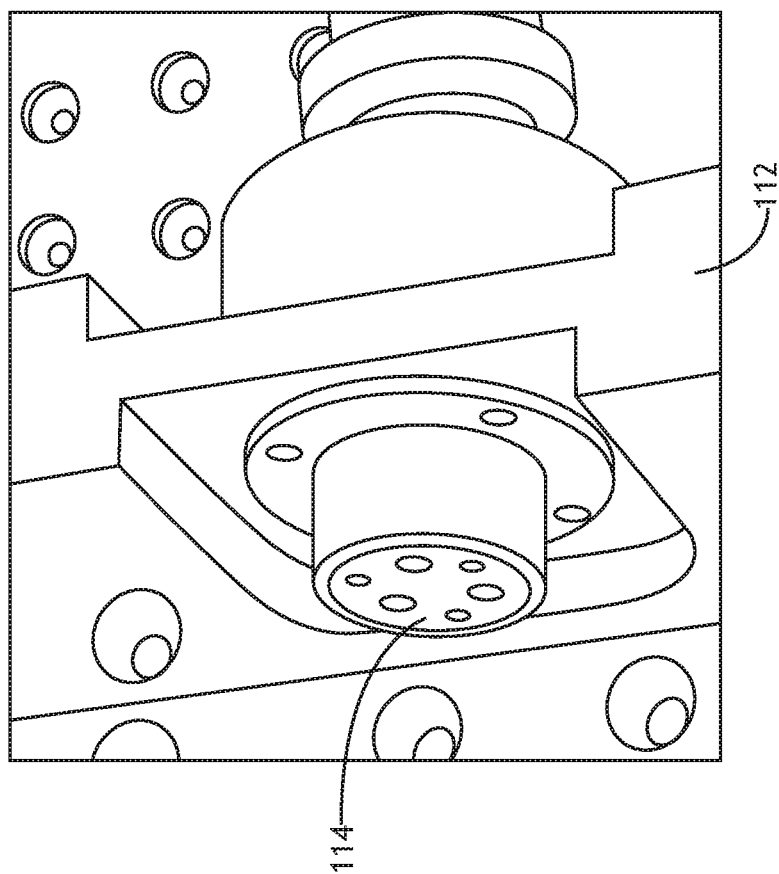
FIG. 4 is a view of an exemplary embodiment of the galley insert bay of the system of FIGS. 1 and 3 according to the inventive concepts disclosed herein.
Figure 5:
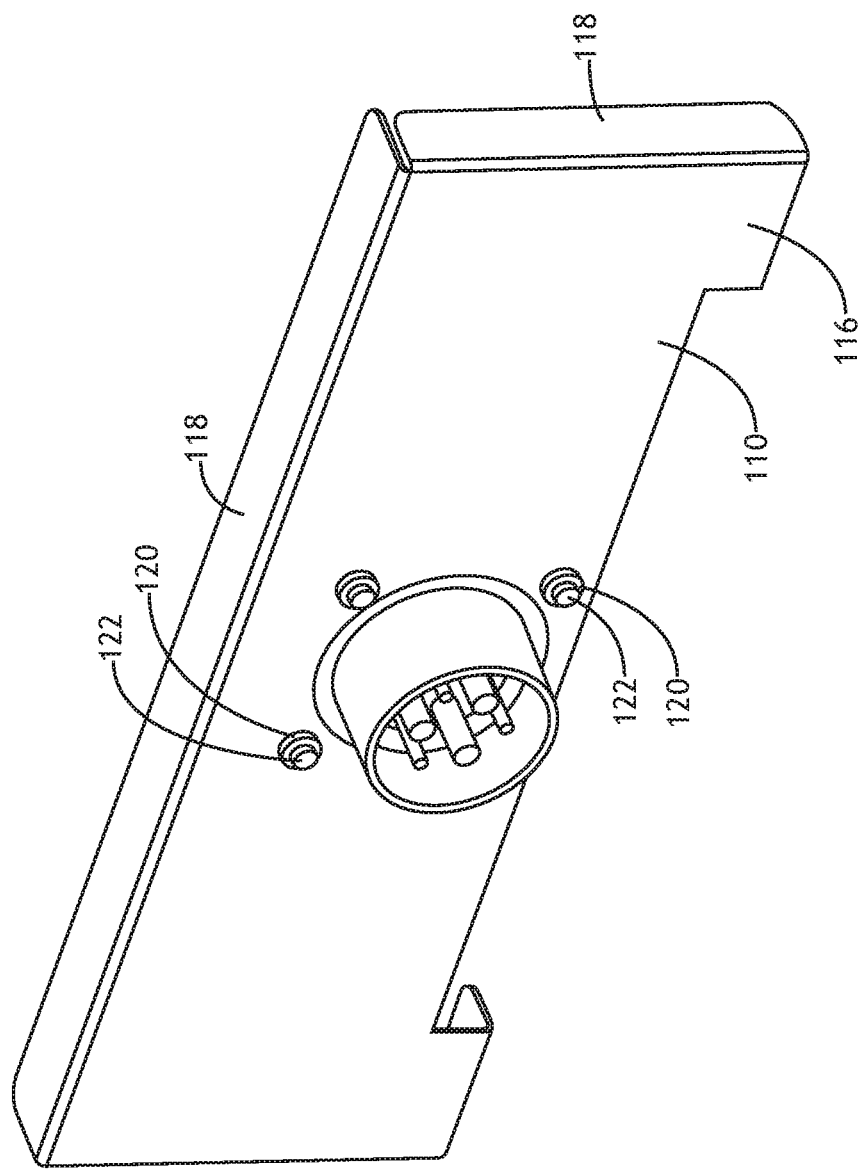
FIG. 5 is a view of an exemplary embodiment of a power connector assembly and a mounting plate of the system of FIG. 1 according to the inventive concepts disclosed herein.
Figure 6:
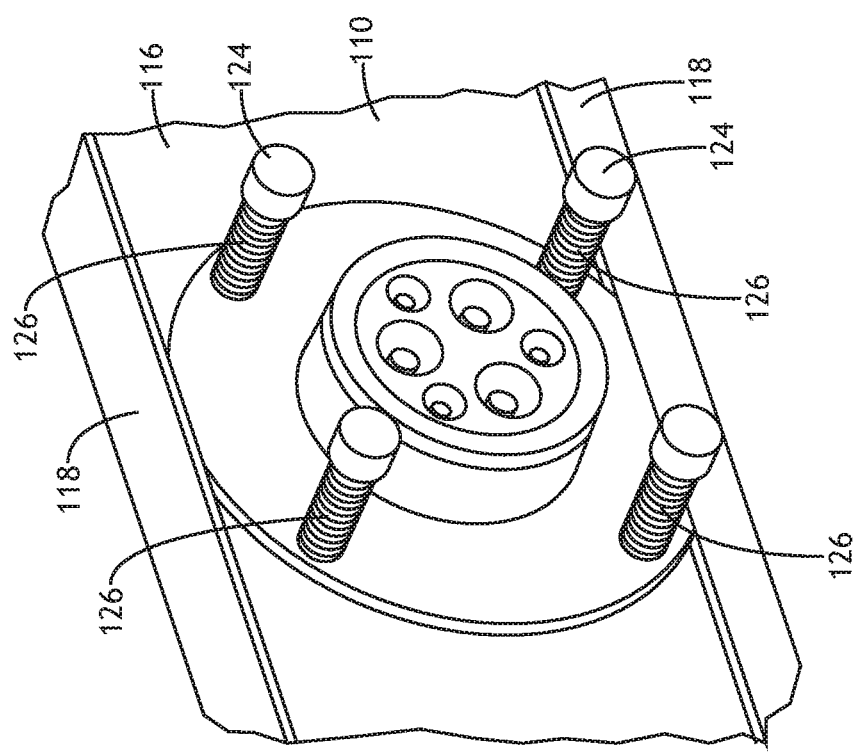
FIG. 6 is a view of an exemplary embodiment of the power connector assembly and the mounting plate of the system of FIGS. 1 and 5 according to the inventive concepts disclosed herein.
Figure 7:
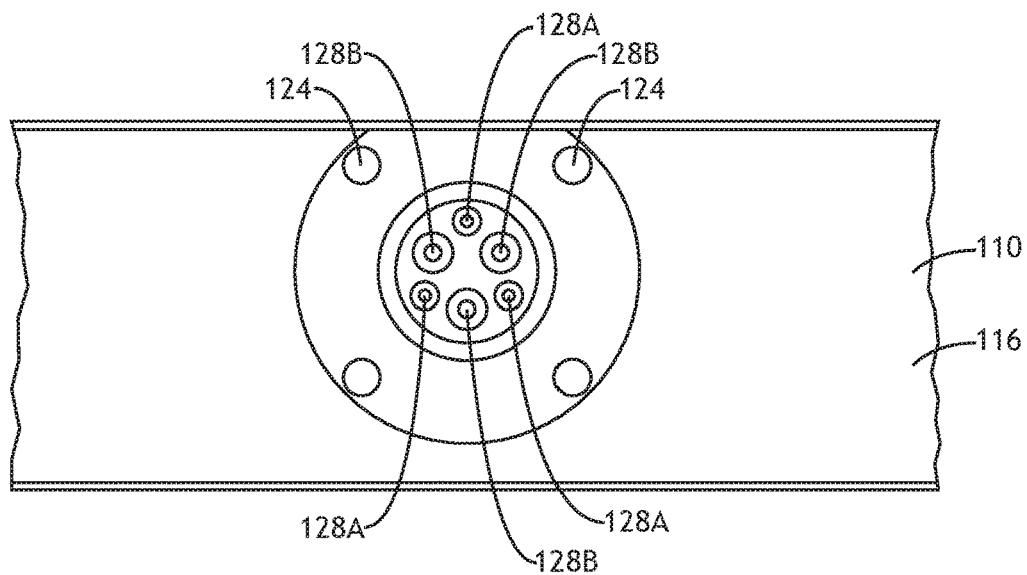
FIG. 7 is a rear view of an exemplary embodiment of the power connector assembly and the mounting plate of the system of FIGS. 1, 5, and 6 according to the inventive concepts disclosed herein.

Referring now to FIGS. 3 and 5, a mounting plate 110 may be attached to the rear 106 of the aircraft galley insert oven 104. The mounting plate 110 may include a first portion 116 that may be parallel to the rear 106 of the aircraft galley insert oven 104 and at least one perpendicular portion 118 that may be perpendicular to the first portion 116. The at least one perpendicular portion 118 may extend outwardly away from the rear 106 of the aircraft galley insert oven 104.

Referring now to FIGS. 3 and 5-13, a power connector assembly 108 may be attached to the mounting plate 110. The power connector assembly 108 may include at least two (e.g., four) compressible spring assemblies that compress as the power connector assembly 108 is mated with a corresponding power connector assembly 114 of the aircraft galley insert bay 112. The power connector assembly 108 may self-align with the corresponding power connector assembly 114 of the aircraft galley insert bay 112 when the aircraft galley insert oven 104 is installed within the aircraft galley insert bay 112. In some embodiments, the power connector assembly 108 may be a female power connector assembly, and the corresponding power connector assembly 114 of the aircraft galley insert bay 112 may be a male corresponding power connector assembly, or vice versa.

Referring now to FIGS. 4 and 6-13, in some embodiments, the at least two (e.g., four) compressible spring assemblies may be positioned in a radially symmetric fashion. The compressible spring assemblies may provide compressive resistive force on the power connector assembly 108 during installation of the aircraft galley insert oven 104 in the aircraft galley insert bay 112.

Referring now to FIGS. 5-13, each of the compressible spring assemblies may include a spring 126, a bolt 122 that extends through the spring 126, and a fastener 120 that may be attached to the mounting plate 110. With respect to each of the compressible spring assemblies, the spring 126 may be compressed while the bolt 122 remains stationary when the power connector assembly 108 mates with the corresponding power connector assembly 114 of the aircraft galley insert bay 112. Each bolt 122 may include at least one bolt head 124 (e.g., at one or both ends of the bolt 122). The fastener 120 may constrain the mounting plate 110, the power connector assembly 108, and the spring 126 in a respective position.

Referring now to FIGS. 5-7, 9, and 10, the power connector assembly 108 may provide multiple (e.g., at least four (e.g., six)) electrical connections 128A, 128B to the corresponding power connector assembly 114 of the aircraft galley insert bay 112. The power connector assembly 108 may connect with the corresponding power connector assembly 114 to provide an electrical power supply (e.g., a two- or three-phase power supply) in the galley 102 to the aircraft galley insert oven 104. In some embodiments, the power connector assembly 108 may provide a three-phase power connection to the aircraft galley insert oven 104. In some embodiments, six electrical connections 128A, 128B may include three first-diameter-sized electrical connections 128A and three second-diameter-sized electrical connections 128B, wherein the three first-diameter-sized electrical connections 128A may have a smaller diameter than the three second-diameter-sized electrical connections 128B. For example, the three first-diameter-sized electrical connections 128A may be arranged at first vertices of a first triangle, and three second-diameter-sized electrical connections 128B may be arranged at second vertices of a second triangle, wherein the first triangle is in an inverted orientation compared to the second triangle.

Figure 8:
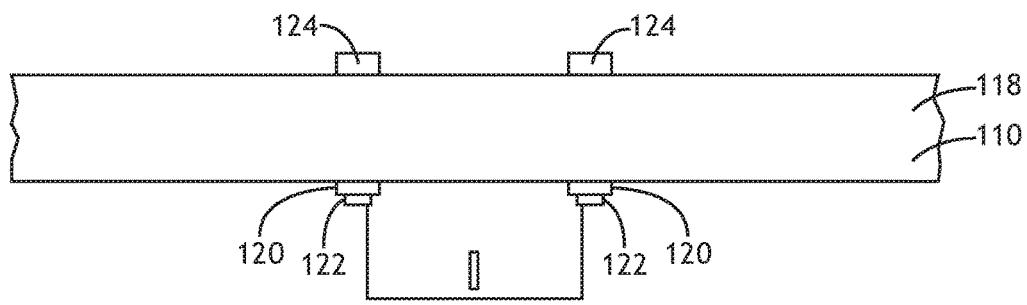
FIG. 8 is a top view of an exemplary embodiment of the power connector assembly and the mounting plate of the system of FIGS. 1, 5, 6, and 7 according to the inventive concepts disclosed herein.
Figure 9:
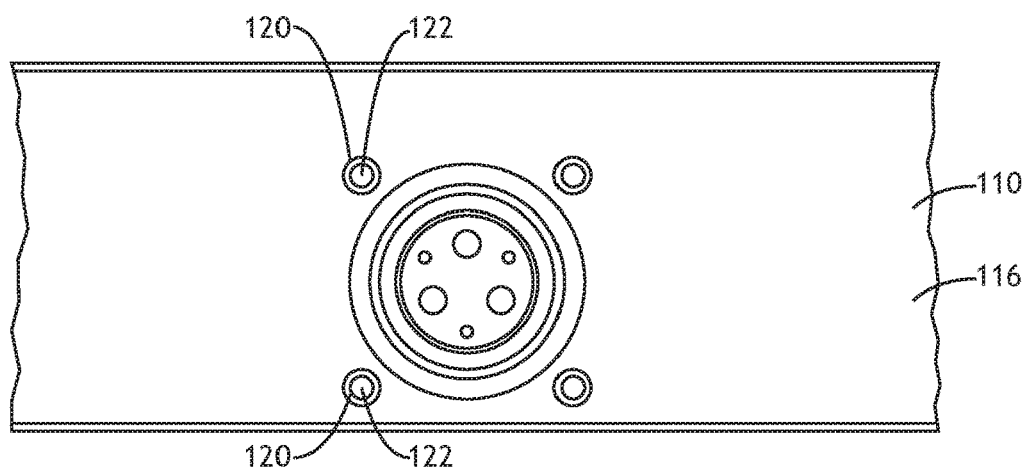
FIG. 9 is a front view of an exemplary embodiment of the power connector assembly and the mounting plate of the system of FIGS. 1, 5, 6, 7, and 8 according to the inventive concepts disclosed herein.
Figure 10:
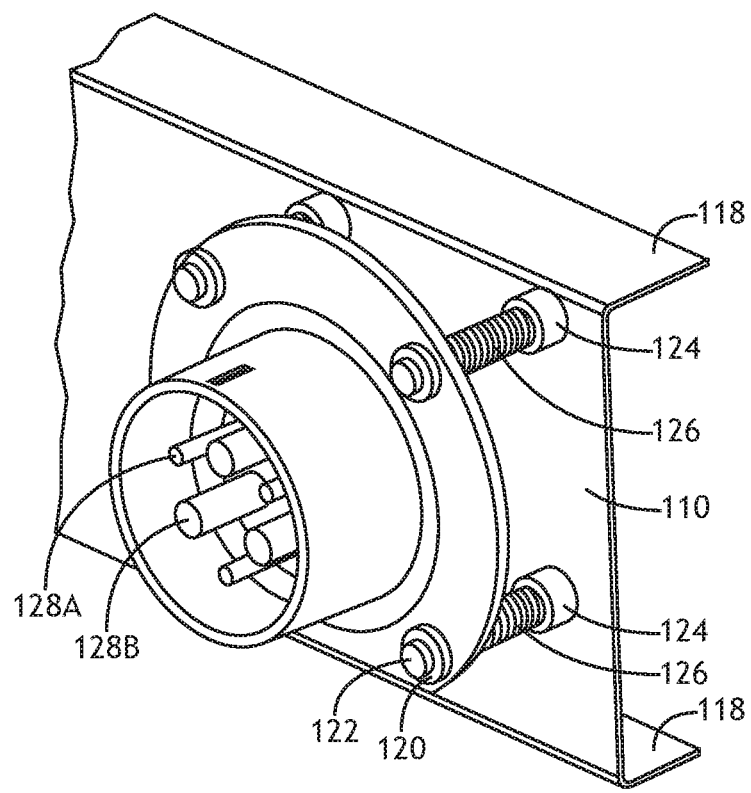
FIG. 10 is an isometric, partial see-through view of an exemplary embodiment of the power connector assembly and the mounting plate of the system of FIGS. 1, 5, 6, 7, 8, and 9 according to the inventive concepts disclosed herein.
Figure 11:
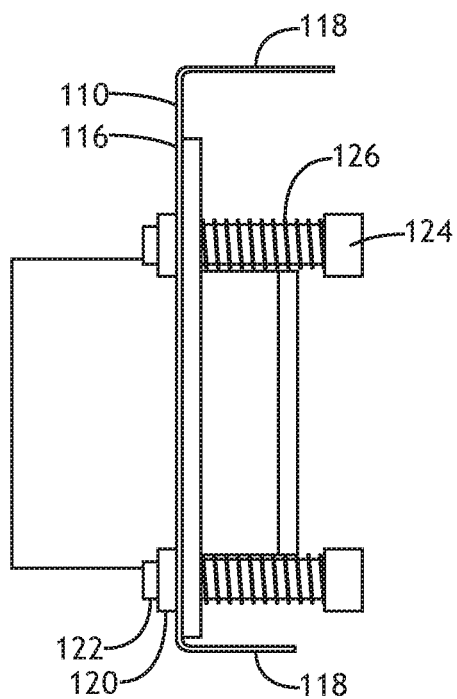
FIG. 11 is a side view of an exemplary embodiment of the power connector assembly and the mounting plate of the system of FIGS. 1, 5, 6, 7, 8, 9, and 10 according to the inventive concepts disclosed herein.
Figure 12:
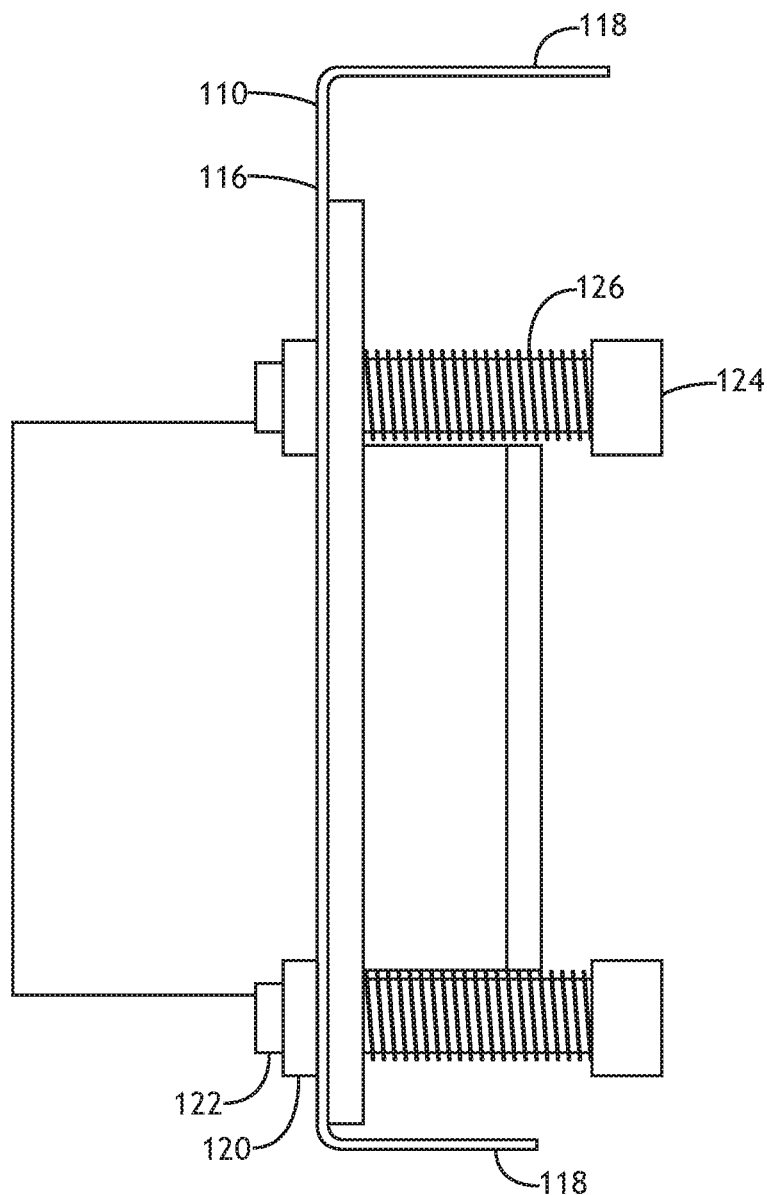
FIG. 12 is a side view of an exemplary embodiment of the power connector assembly and the mounting plate of the system of FIGS. 1, 5, 6, 7, 8, 9, 10, and 11 according to the inventive concepts disclosed herein.
Figure 13:
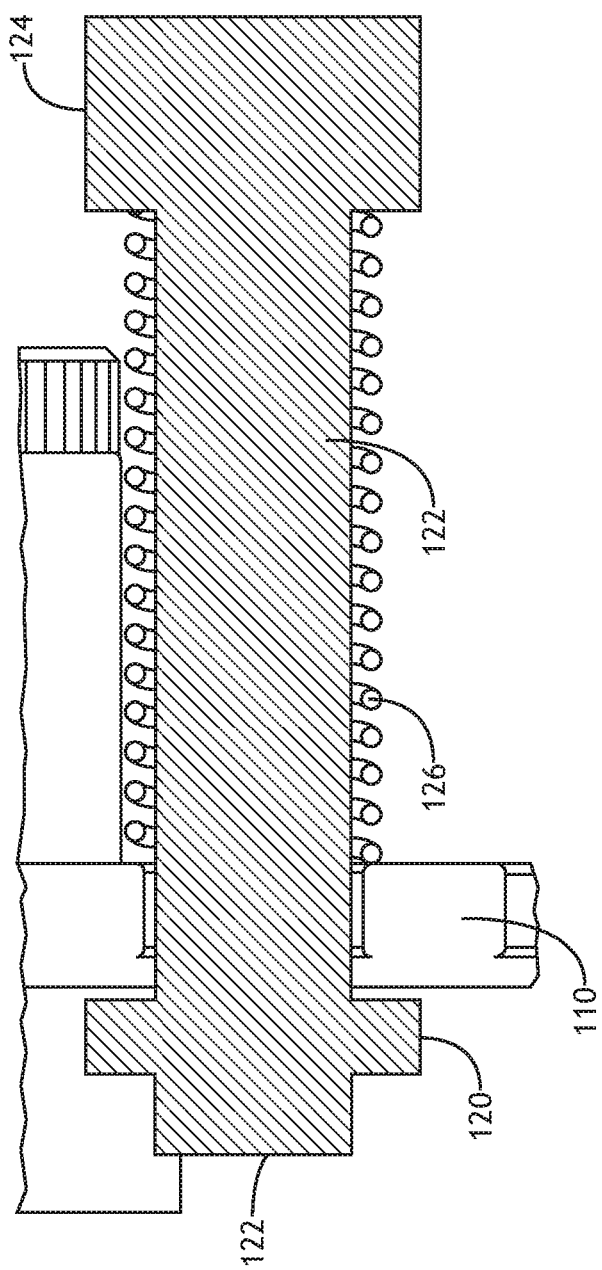
FIG. 13 is a cross-sectional view of an exemplary embodiment of the power connector assembly and the mounting plate of the system of FIGS. 1, 5, 6, 7, 8, 9, 10, 11, and 12 according to the inventive concepts disclosed herein.

Referring now to FIGS. 8, 11, and 12, the at least one perpendicular portion 118 of the mounting plate 106 may extend outwardly away from the rear 106 of the aircraft galley insert oven 104 in amount further than electrical connection portions of the power connector assembly 108. With respect to each of the at least two compressible spring assemblies, the bolt 122 (e.g., the bolt head 124 portion) may extend past the at least one perpendicular portion 118. The at least one perpendicular portion 118 may prevent damage to the power connector assembly 108 by absorbing contact with an object (e.g., a wall or box) that may abut the at least one perpendicular portion 118, such as when the aircraft galley insert oven 104 is being moved prior to installation.

Referring now to FIGS. 5-13, the mounting plate 110 may provide structural support for the compressible spring assemblies that may hold the power connector assembly 108 in place. The mounting plate 110 may also provide a physical connection between the aircraft galley insert (e.g., the aircraft galley insert oven 104) and the compressible spring assemblies.

As will be appreciated from the above, embodiments of the inventive concepts disclosed herein may be directed to a method of installing and a system including an aircraft galley insert configured to be installed within an aircraft galley insert bay, a mounting plate attached to a rear of the aircraft galley insert, and a power connector assembly attached to the mounting plate.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
an aircraft galley insert configured to be installed within an aircraft galley insert bay;
a mounting plate attached to a rear of the aircraft galley insert; and
a power connector assembly attached to the mounting plate, the power connector assembly comprising at least two compressible spring assemblies that compress as the power connector assembly is mated with a corresponding power connector assembly of the aircraft galley insert bay,
wherein the power connector assembly self-aligns with the corresponding power connector assembly of the aircraft galley insert bay when the aircraft galley insert is installed within the aircraft galley insert bay,
wherein each of the at least two compressible spring assemblies comprises a spring and a bolt that extends through the spring,
wherein a portion of each of the at least two compressible spring assemblies is attached to the mounting plate,
wherein the mounting plate comprises a first portion parallel to the rear of the aircraft galley insert and at least one perpendicular portion perpendicular to the first portion that extends outwardly away from the rear of the aircraft galley insert,
wherein the at least one perpendicular portion extends outwardly away from the rear of the aircraft galley insert in an amount further than electrical connection portions of the power connector assembly, wherein, with respect to each of the at least two compressible spring assemblies, the bolt extends past the at least one perpendicular portion.

2. The system of claim 1, wherein the aircraft galley insert is an aircraft galley oven insert.

3. The system of claim 1, wherein the at least two compressible spring assemblies comprises at least four compressible spring assemblies.

4. The system of claim 3, wherein the at least four compressible spring assemblies are positioned in a radially symmetric fashion.

5. The system of claim 1, wherein the power connector assembly provides at least four electrical connections to the corresponding power connector assembly of the aircraft galley insert bay.

6. The system of claim 5, wherein the power connector assembly provides six electrical connections to the corresponding power connector assembly of the aircraft galley insert bay, wherein the power connector assembly provides a three-phase power connection.

7. The system of claim 6, wherein the six electrical connections comprises three first-diameter-sized electrical connections and three second-diameter-sized electrical connections, the three first-diameter-sized electrical connections having a smaller diameter than the three second-diameter-sized electrical connections.

8. The system of claim 7, wherein the three first-diameter-sized electrical connections are arranged at first vertices of a first triangle, wherein three second-diameter-sized electrical connections are arranged at second vertices of a second triangle, wherein the first triangle is in an inverted orientation compared to the second triangle.

9. The system of claim 1, wherein the power connector assembly is a female power connector assembly, wherein the corresponding power connector assembly of the aircraft galley insert bay is a male corresponding power connector assembly.

10. The system of claim 1, wherein the at least one perpendicular portion prevents damage to the power connector assembly by absorbing contact with an object abutting the at least one perpendicular portion.

\* \* \* \* \*